United States Patent

[11] 3,596,303

| [72] | Inventors | Garrett P. Kelley<br>Fox Pint;<br>William C. Steinberg, Shorewood, both of, Wis. |
|---|---|---|
| [21] | Appl. No. | 580,347 |
| [22] | Filed | Sept. 19, 1966 |
| [45] | Patented | Aug. 3, 1971 |
| [73] | Assignee | Kelley Company, Inc.<br>Milwaukee, Wis. |

[54] DOCKBOARD
10 Claims, 11 Drawing Figs.

| [52] | U.S. Cl. | 14/71 |
| [51] | Int. Cl. | B65g 11/00 |
| [50] | Field of Search | 14/71, 72 |

[56] References Cited
UNITED STATES PATENTS

| 1,993,261 | 3/1935 | Colgate | 14/71 |
| 2,473,126 | 6/1949 | Alexander | 14/71 |
| 2,644,180 | 7/1953 | Eycleshimer | 14/72 |
| 3,018,496 | 1/1962 | Hosbein | 14/71 |
| 3,095,591 | 7/1963 | Buck | 14/72 |

Primary Examiner—Jacob L. Nackenoff
Attorney—Andrus, Sceales, Starke and Sawall

ABSTRACT: A dockboard pivotally connected intermediate its ends to guides which is movable in fixed guides on the face of the dock whereby the dockboard may be lifted from a substantially vertical stored position below dock level to a raised position, rotated into substantially horizontal cross traffic position, and then lowered to span the gap between the dock and the bed of a carrier.

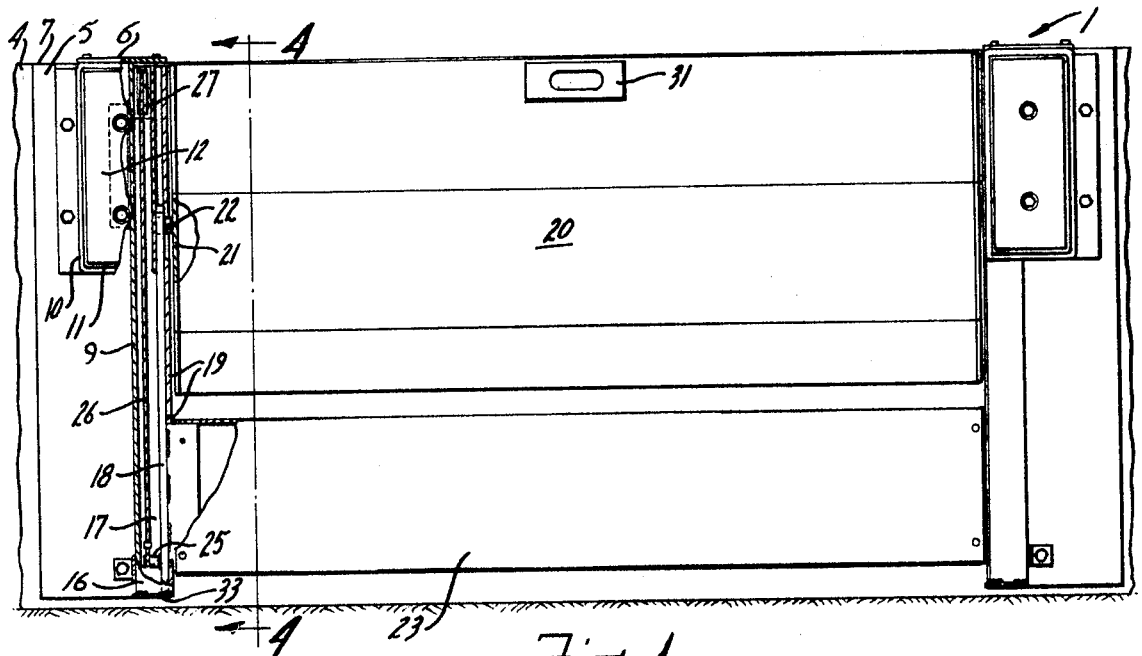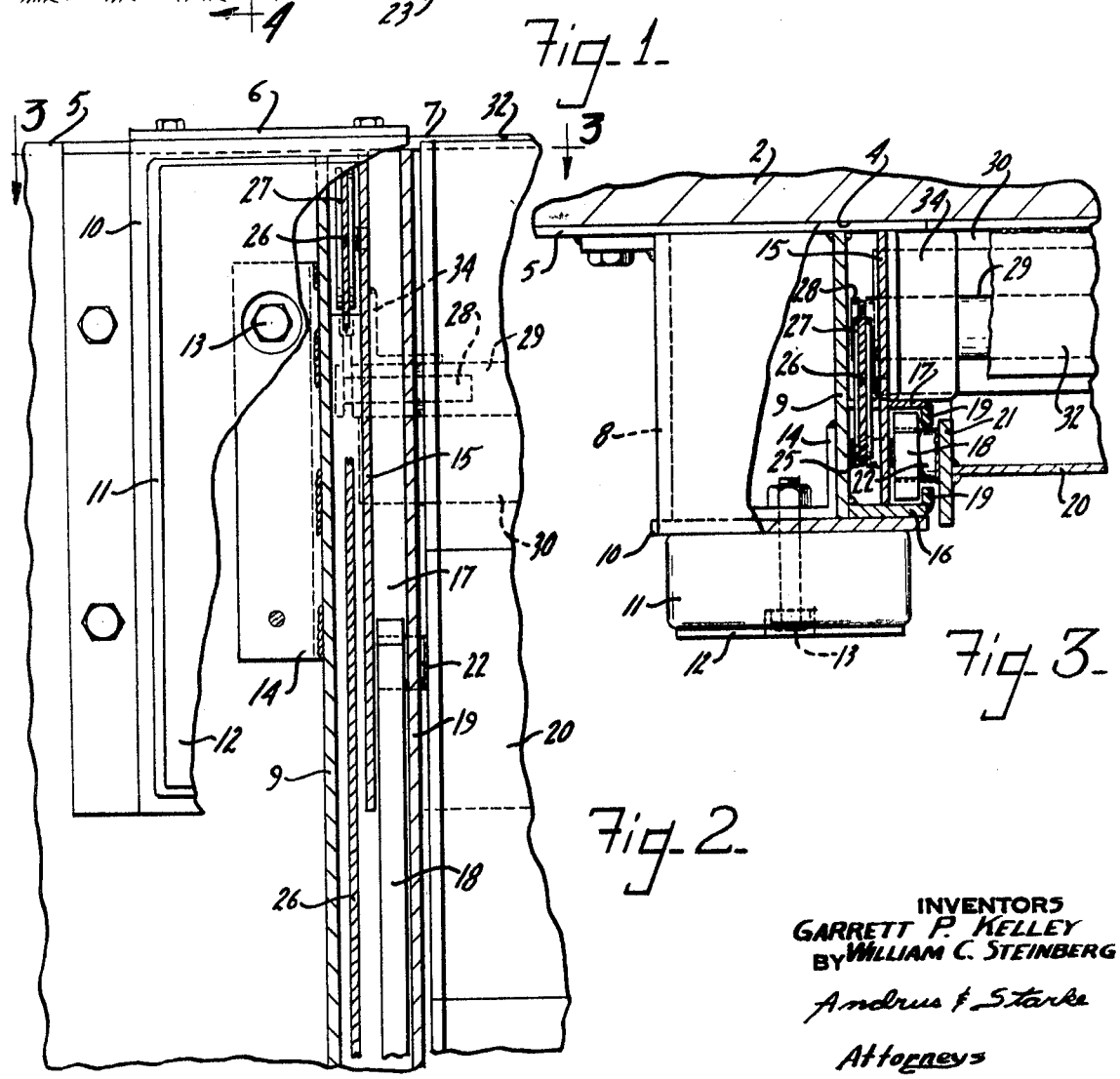

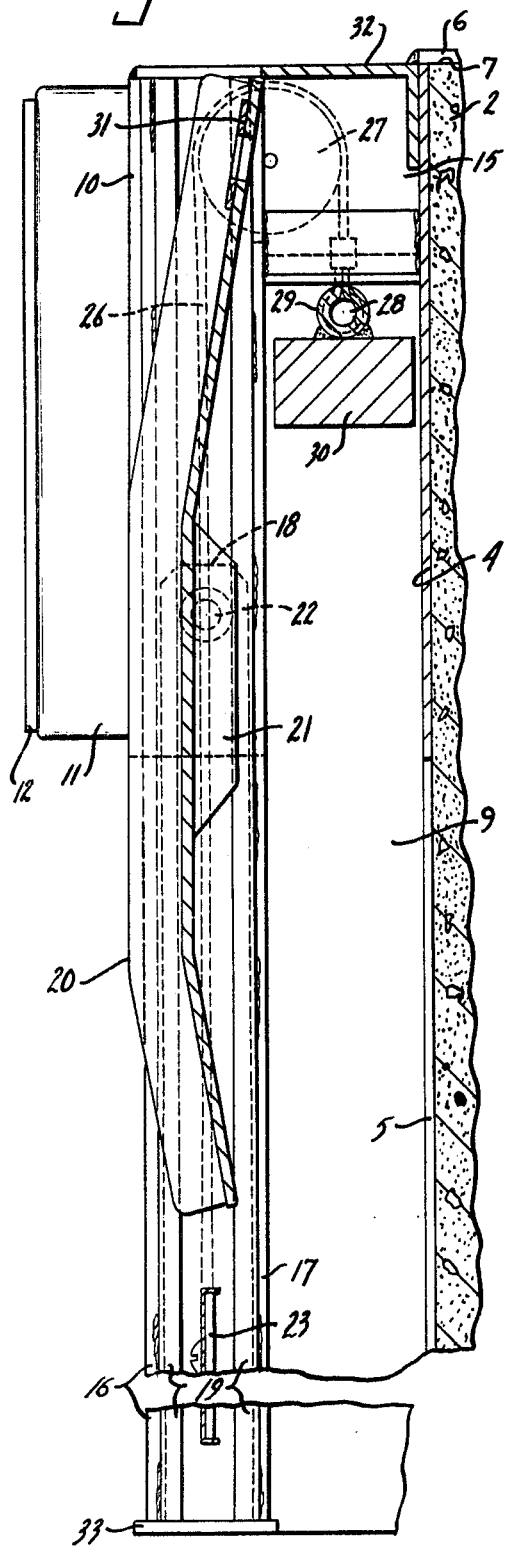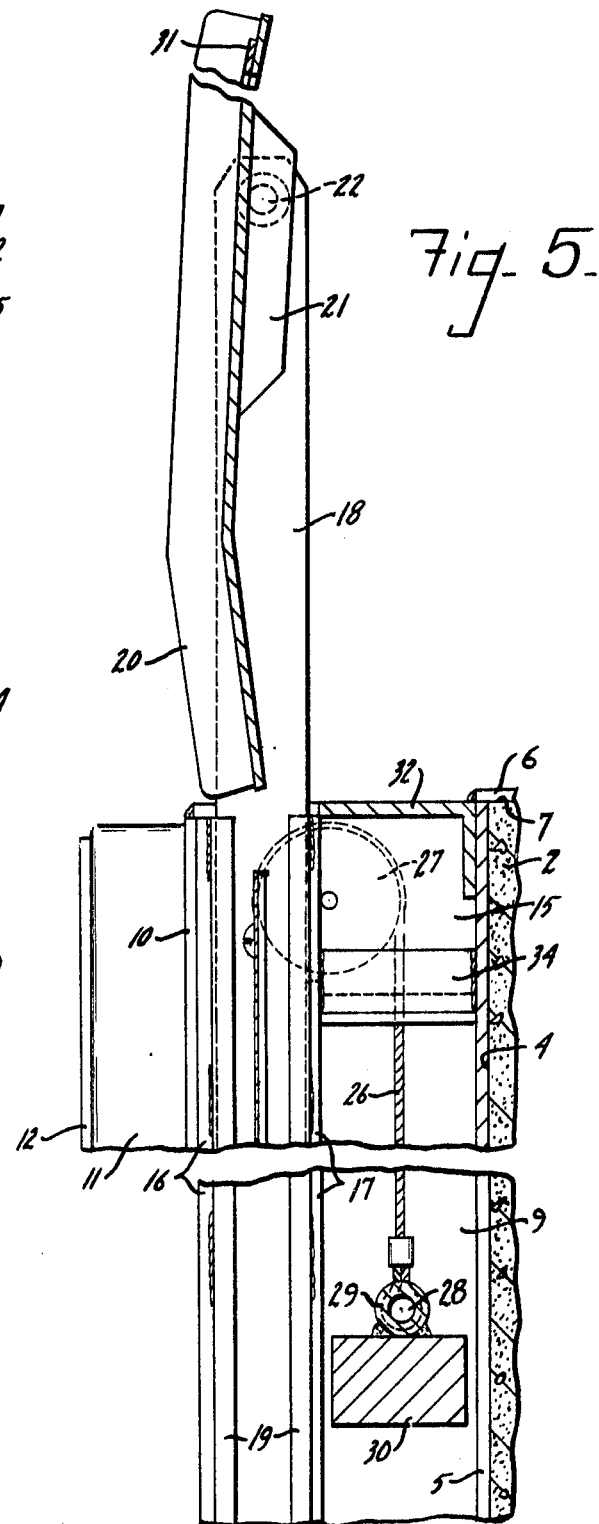

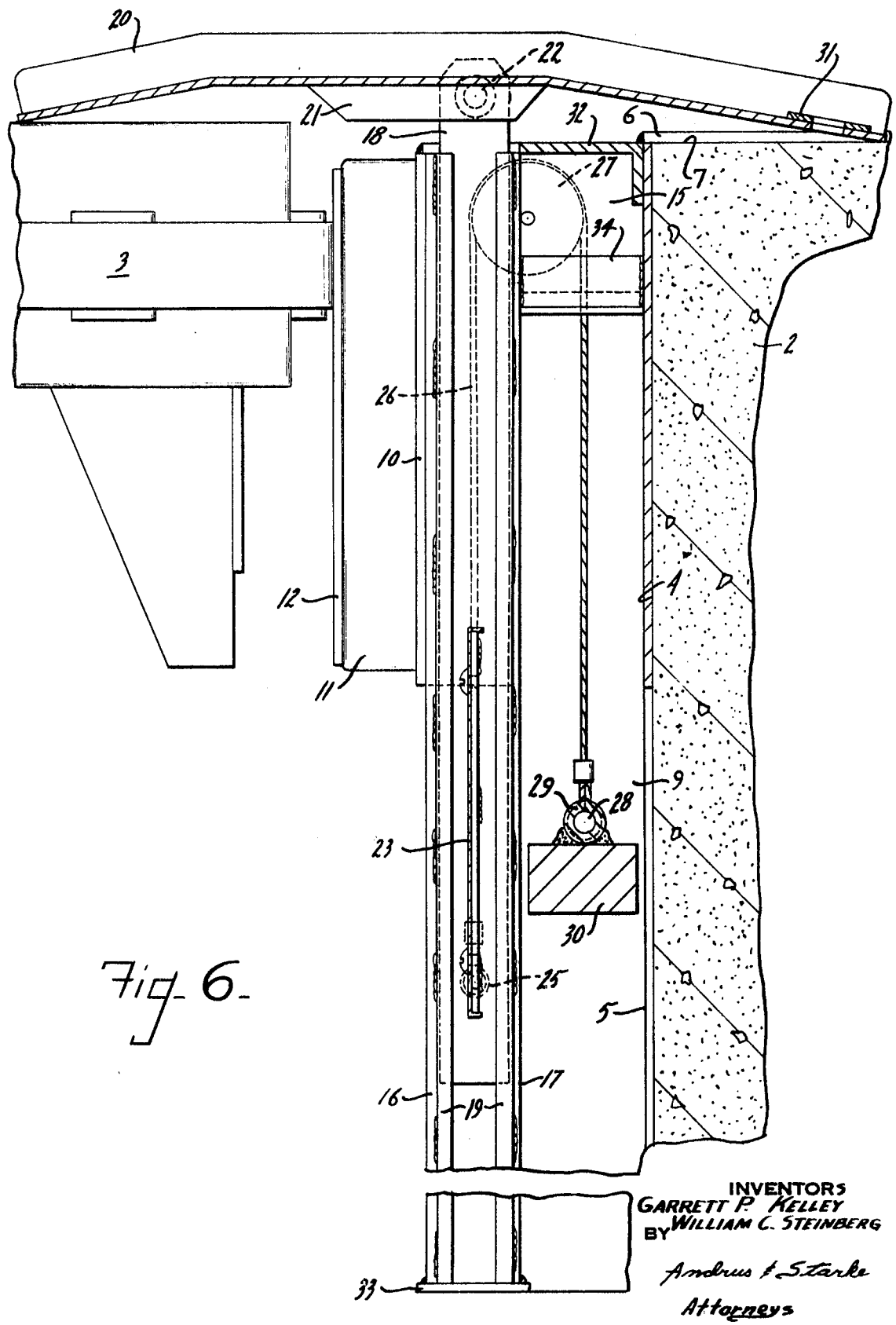

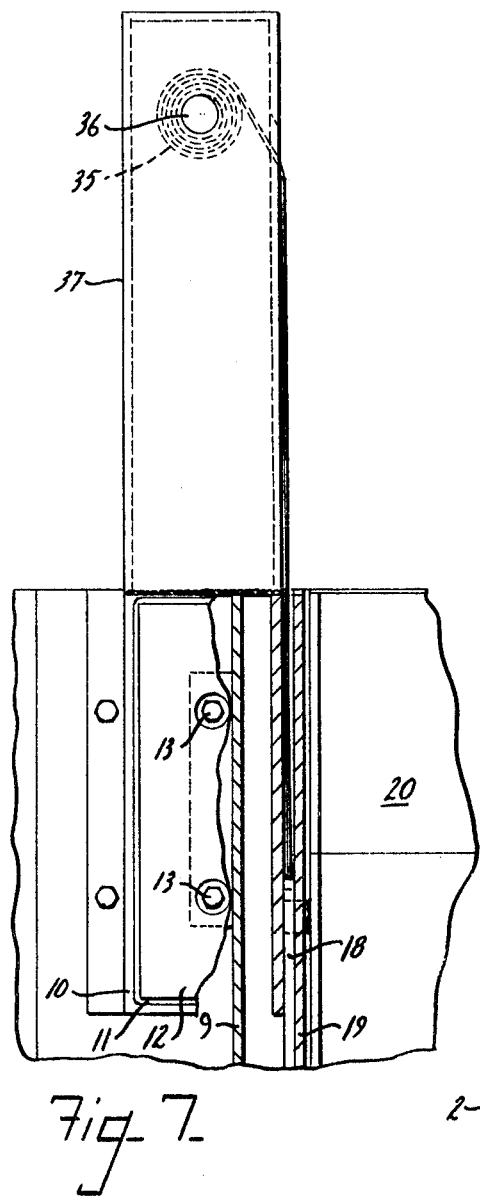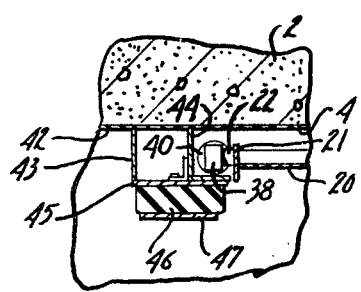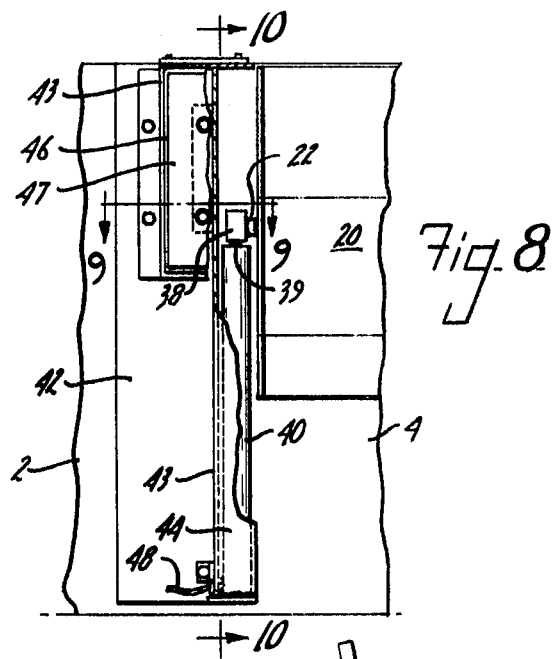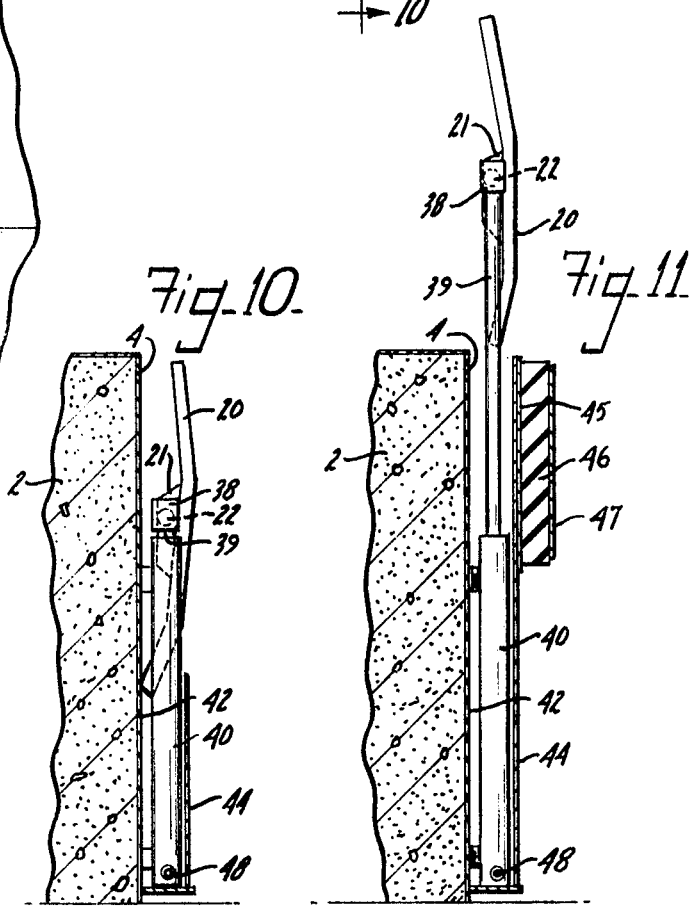

DOCKBOARD

This invention relates to an adjustable dockboard and more particularly to a dockboard which can be installed with existing docks without alteration of the dock.

Dockboards are used to span the gap between a loading dock or platform and the bed of a carrier located in a loading or unloading position in front of the dock. One common form of dockboard includes a ramp which is mounted flush with the upper surface of the dock and the rear edge of the ramp is hinged to the dock. In this type of dockboard the ramp is biased upwardly to an inclined position and a holding means is provided which locks or restrains the ramp in the lowered position. When it is desired to load or unload a truck or other carrier, the holding means is released through manual operation of a cable and the ramp will pivot upwardly, and simultaneously, the extension lip on the front of the ramp will be pivoted outwardly. By walking outwardly on the ramp, the ramp will pivot downwardly against the force of the biasing means to bring the lip in engagement with the bed of the truck and the holding means will hold the ramp in this position in which the ramp spans the distance between the dock and the truck bed.

With this conventional type of dockboard, the dock is formed with a pit or depression to receive the dockboard so that the ramp will be in a flush position with respect to the upper surface of the dock and will not interfere with cross traffic. With a new dock installation, the pit necessary to receive the dockboard can be readily formed in the dock, but with existing docks it is necessary to rebuild the dock in order to provide the pit or depression to receive the dockboard.

The present invention is related to an inexpensive dockboard which can be installed with existing docks without alteration or modification of the dock. The dockboard includes a ramp which is movable from an inoperative or storage position, in which the ramp is disposed vertically adjacent the front surface of the dock, to an operating position in which the ramp is generally horizontal and spans the gap between the dock and the bed of the truck. More specifically, the side edges of the ramp are pivotally connected to guide bars which are movable within vertical guide ways mounted in spaced relation on the front wall of the dock. The weight of the ramp is counterbalanced by a counterweight or spring, and the upper edge of the ramp, when in the vertical storage position, is provided with a handle or other means which enables the operator to lift the ramp vertically upward. Due to the counterbalancing effect, the ramp can be readily lifted to a position where the lower edge of the ramp is above the level of the bed of the truck or carrier. The ramp is then pivoted to a generally horizontal position, and the guide bars slide downwardly until the rear edge of the ramp engages the dock and the front edge of the ramp engages the bed of the truck.

Because the guide bars are freely movable, the ramp is readily adjustable to any relative height between the dock and the bed of the carrier. Moreover, the ramp will automatically adjust itself to variations in height caused by raising or lowering of the bed of the truck due to an increase or decrease of weight on the truck bed.

After the truck has been loaded or unloaded, the truck merely pulls away from the dock and due to the fact that the ramp is nose-heavy, the ramp will pivot or swing down to a generally vertical position and the guide bars will slide downwardly within the guideways against the counterbalancing force to automatically lower the ramp to the storage position where the rear edge of the ramp is located slightly beneath the upper surface of the dock. As the ramp automatically returns to its storage position after the truck pulls away from the dock, there is no danger of succeeding trucks backing into, and damaging, the ramp.

The dockboard of the invention is a relatively low-cost unit which can be installed with existing docks or loading platforms without any alteration or modification of the dock. It is not necessary to reconstruct the dock to provide a pit for the dockboard, for the entire unit is mounted on the front wall of the dock.

As a further advantage, the entire unit, when in the storage position, is located adjacent the front wall of the dock where it will not interfere with cross traffic along the dock.

Other objects and advantages will appear in the course of the following description.

The drawings illustrate the best mode presently contemplated of carrying out the invention.

In the drawings:

FIG. 1 is a front elevation of the dockboard of the invention as associated with a loading dock;

FIG. 2 is an enlarged fragmentary front elevation with parts broken away in section;

FIG. 3 is a view taken along line 3–3 of FIG. 2;

FIG. 4 is a section taken along line 4–4 of FIG. 1 showing the ramp in the storage or inoperative position;

FIG. 5 is a view similar to FIG. 4 showing the ramp in the raised position;

FIG. 6 is a view similar to FIG. 4, showing the ramp in the operative position spanning the gap between the dock and the carrier;

FIG. 7 is a fragmentary front elevation of a modified form of the invention with parts broken away in section;

FIG. 8 is a fragmentary front elevation with parts broken away in section of a second modified form of the invention using fluid pressure means to raise the ramp;

FIG. 9 is a section taken along line 9–9 of FIG. 8;

FIG. 10 is a view taken along line 10–10 of FIG. 8 and showing the ramp in the storage or retracted position; and FIG. 11 is a view similar to FIG. 10 showing the ramp in the raised position.

The drawings illustrate an adjustable dockboard 1 which is adapted to extend between a loading dock or platform 2 and the bed 3 of a carrier such as a truck.

The dockboard 1 includes a supporting structure or frame mounted on the front wall 4 of the dock, and the supporting structure comprises a pair of mounting plates 5 which are bolted against the front wall 4. A top plate 6 is welded to the upper edge of each plate 5 and is bolted flatwise to the upper surface 7 of the dock.

As shown in FIGS. 2 and 3, a pair of plates 8 and 9 are secured edgewise to each mounting plate 5 and a front plate 10 is secured to the outer edges of each pair of plates 8 and 9 to provide a generally box-shaped housing or frame. To protect the dashboard 1 from damage as a truck or other carrier is backed toward the dock, a cushion or bumper 11 is mounted on the outer face of each of the front plates 10, and a protective plate 12 is located on the outer surface of the bumper 11. Each plate 12 is secured to the corresponding front plate 10 by bolts 13 which extend through an angle 14 welded to the inner surface of the front plate 10 and the plate 9.

The supporting structure of the dockboard 1 also includes a vertical plate 15 secured edgewise to each mounting plate 5 and located generally parallel to the plate 9. Laterally extending plates 16 and 17 are secured edgewise to each of the plates 9, and plate 15, along with the corresponding plates 16 and 17, form guideways which slidably receive a guide bar 18. As best shown in FIG. 3, each of the guide plates 16 and 17 is provided with an an inwardly extending flange 19 which retains the guide bar 18 within the guideway.

The plate 8, along with the plates 16 and 17, extend downwardly to a position slightly above the ground, while the plate 15 terminates at a location substantially above the ground level.

The dockboard 1 includes a ramp 20 adapted to be moved from a vertical storage position adjacent the front wall 4 of dock 2 to a generally horizontal operating position in which the ramp spans the gap between the dock 2 and the bed 3 of the carrier. Ramp 20 is provided with side flanges 21 and a stub shaft 22 is secured to each of the flanges 21 and extends laterally outward from the respective flange. Shafts 22 are journaled within openings in the corresponding guide bars 18.

This connection enables the ramp 20 to be moved vertically in accordance with vertical movement of the guide bars 18 and yet permits the ramp 20 to pivot with respect to the guide bars.

To insure smooth sliding movement of the guide bars 18 within the guideways and prevent jamming, a crossbar 23 is secured between the lower ends of the guide bars 18.

The ramp 20, as shown in FIG. 1, is in the storage or inoperative position in which the ramp is disposed in spaced relation to the front wall 4 of the dock 2 with the rear edge of the ramp 20 being located slightly beneath, or flush with, the upper surface 7 of the dock. In this position, as shown in FIG. 3, the ramp is located inwardly of the bumpers 12 so that a truck or other carrier backing toward the dock 2 will not engage the ramp or operating mechanism.

The ramp 20 is adapted to be lifted upwardly and then pivoted to a generally horizontal position in which the ramp spans the gap between the dock 2 and the bed 3 of the truck, as shown in FIG. 6. To counterbalance the weight of the ramp 20, a counterweight system is employed. In this regard, a stud 25 is secured to the lower end of each of the guide bars 18 and a cable 26 is attached to each stud 25 and extends upwardly over a pulley 27 which is mounted for rotation on the plate 15 adjacent the upper end of the dockboard. The opposite end of the cable 26 extends downwardly and is connected to a pin 28 mounted within tube 29 secured to the upper surface of a weight 30, which is in the form of an elongated bar extending the entire length of the ramp 20. The weight 30 is designed so that it will counterbalance about 95 percent of the weight of the ramp 20 so that the ramp can be easily lifted from its storage or inoperative position. To enable an operator standing on the dock to lift the ramp 20 from the storage position, a handle or other grasping mechanism is connected to the rear edge of the ramp. As shown in FIG. 1, a generally oval plate 31 is welded to the rear edge of the ramp 20 and the opening in the plate 31 is located in alignment with an opening in the ramp itself so the operator may conveniently grasp the ramp by inserting his hand through the aligned openings. Other types of handles can be utilized with the ramp. However, it is preferred to use a handle which will not protrude upwardly from the ramp 20 to any appreciable extent when the ramp is in the operating position, so that the handle will not interfere with the movement of loading trucks on the ramp.

The handle provided by the oval plate 31 is important to the invention in that it enables the operator standing on the dock to grasp the upper edge of the ramp 20 so that it can be pulled upwardly to the position shown in FIG. 5. As the truck or other carrier is normally backed into a position against the bumpers 11, it is not normally possible to raise the ramp from below and the handle thus enables the operator to raise or lift the ramp with the truck in loading position without leaving the dock.

As shown in FIG. 3, the ramp is spaced outwardly of the front wall 4 of the dock 2 and an angle beam 32 is secured between the plates 9 and against the front wall 5. Angle beam 32 serves to provide reinforcement for the unit, as well as enclosing the gap between the front wall 4 of the dock and the ramp 20 when the ramp is in the pendant or storage position, as shown in FIG. 1.

The ramp 20 is stored in the position, as shown in FIG. 1, in which the ramp is generally vertical with the rear edge of the ramp located slightly below the upper surface 7 of the dock. The truck or other carrier backs toward the dock until the bed of the truck engages the bumpers 11. In this position, the load at the end of the truck is removed if the truck is unloading, and after removal of the end load, the operator pulls upwardly on the handle plate 31, moving the ramp 20 to a position, as shown in FIG. 5. In this position, the lower edge of the ramp is located above the bed 3 of the truck so that the ramp can then be pivoted to a generally horizontal position. After pivoting the ramp to this position, the ramp descends by gravity with the bars 18 sliding downwardly within the guideways until the rear edge of the ramp engages the dock surface 7, and the forward edge of the ramp engages the bed 3 of the carrier.

As the ramp is pivotally attached to the guide bars 18 and as the guide bars are freely slidable within the guideways, the ramp can accommodate substantial variances in height between the dock surface 7 and the bed 3 of the carrier and the ramp can also adjust its vertical position as the bed of the truck may raise and lower during the loading operation. For example, if the truck is unloading, the bed of the truck may raise slightly as the load is removed from the truck bed, while in other cases the bed of the truck may lower due to a loading truck moving across the bed or as an additional load is applied to the bed. In either case, the pivotal connection of the ramp to the guide bars 18 and the sliding connection to the guide bars within the guideways enables the ramp to follow these variations in relative height of the bed.

When the loading or unloading operation has been completed, the truck merely pulls away from the dock. Due to the fact that the ramp 20 is nose-heavy, the forward edge of the ramp will pivot downwardly between the guide bars 18, and as the weight of the ramp is greater than the counterbalancing force, the guide bars 18 and the ramp will move downwardly by gravity until the lower end of the bars 18 engage plates 33 which are secured to the lower ends of plates 9, 16 and 17. Engagement of bars 18 with stop plates 33 will stop the movement of the ramp at a position where the rear edge of the ramp is located slightly below the upper surface 7 of the dock, as shown in FIG. 1.

To prevent the counterweight 30 from flying upwardly by inertia after the guide bars engage stop plates 33 to terminate downwardly movement of the ramp, an angle stop 34 is secured to each plate 15 and is positioned to be engaged by weight 30 immediately after guide bars 18 engage the stop plates 33. Stops 34 prevent continued upward movement of weight and eliminate the possibility of cables 26 being displaced from pulleys 27.

As previously mentioned, to enable the forward edge of ramp 20 to pivot downwardly when the truck bed 3 is withdrawn, the forward edge of the ramp is biased to pivot downwardly. This condition can be achieved by arranging the pivotal connection between the side edges of the ramp and guide bars 18 to the rear of the midpoint of the width of the ramp, offset from the center of gravity, so that the forward edge will pivot or tilt downwardly by gravity. A similar action can be achieved by weighting the forward edge of the ramp or by resilient biasing means, such as a spring.

FIG. 7 illustrates a modified form of the invention in which a spring is employed as the counterbalancing force rather than the weight 30, as shown in FIGS. 1—6. In this embodiment, one end of a constant force, coil spring 35 is secured to each of the guide bars 18, while the opposite end of each spring 35 is coiled about a shaft 36 which is mounted for rotation within opposite walls of a housing 37, mounted on the upper surface 7 of the dock 2. The springs 35 function in a manner similar to the weight 30 and provide a counterbalancing force for the weight of the ramp. As previously described, the counterbalancing force of the spring 35 permits the operator to raise the ramp with a minimum force and also aids in reducing the speed of downwardly movement of the ramp to the storage position.

FIGS. 8—11 show a second modified form of the invention in which power-operated means is employed to lift the ramp. In this embodiment the stub shafts 22 which project outwardly from the side flanges 21 on ramp 20 are pivotally connected to pillow blocks 38 attached to the upper ends of piston rods 39. Each piston rod 39 is secured to a piston which is slidable with a hydraulic cylinder 40 mounted vertically by brackets 41 to the front wall 4 of dock 2.

The cylinders 40, as well as the ramp 20, are protected against damage by a truck or other carrier backing toward the dock by a generally box-shaped frame which extends outwardly from mounting plate 42 attached to the front wall 4 of the dock. The frame includes a plate 43 which extends outwardly from the mounting plate, and a second L-shaped member 44 has one flange welded edgewise to the mounting plate in spaced relation to plate 43, while the other flange of member 44 extends laterally and encloses the respective cylinder 40.

As in the case of the first embodiment a front plate 45 is secured to the plate 43 and L-shaped member 44, and a protective cushion 46 and plate 47 are mounted to the outer surface of front plate 45.

As shown in FIGS. 8 and 10, the ramp 20 is stored in a vertical position adjacent the front wall 4 of dock 2, and the upper edge of the ramp is located slightly beneath the level of the upper surface 7 of the dock. When the carrier bed 3 is in loading or unloading position, the operator actuates a suitable hydraulic control unit normally mounted on the dock to introduce hydraulic fluid into the lower ends of cylinders 40 through lines 48. Introducing fluid into the lower ends of cylinders 40, will cause piston rods 39 to extend, thereby raising the ramp 20 to the position shown in FIG. 11, when the lower edge of the ramp will be above the upper surface of dock 2. The ramp 20 can then be pivoted to the horizontal position, and on release of the pressure in cylinders 40, the piston rods 39 will slowly retract until the rear edge of the ramp engages the dock and the forward edge of the ramp engages the bed 3 of the carrier.

The front edge of the ramp is biased to pivot downwardly, either by the location of the pivotal connection, nose-heavy weighting, spring means or the like, and after the loading or unloading operation is completed, the ramp will pivot to a generally vertical position, and piston rods 39 will retract so that the ramp will automatically return to the vertical storage position shown in FIG. 8.

The dockboard of the invention is an inexpensive unit which can be installed without major alteration or modification of an existing dock. The ramp is automatically adjustable to any relative height between the dock and the bed of the carrier and the ramp will also compensate for variations in relative height between the dock and carrier bed caused by raising or lowering of the bed during loading and unloading.

As the front edge of the ramp is biased to pivot downwardly, the ramp will swing to a vertical position and will automatically descend to the vertical storage position after the carrier has pulled away from the dock. In the storage position, the entire unit is located adjacent the front wall of the dock where it will not interfere with cross traffic on the dock.

While the drawings illustrate the side edges of the ramp pivotally connected to a pair of guide members, it is contemplated that in some situations the guide members may be connected at other locations to the ramp, or in other applications a single guide member can be employed. Moreover the guide members can also take the form of rollers or other rotatable elements which operate in guide tracks rather than elongated guide bars as shown in the drawings.

While the counterbalancing force, illustrated by the weight 30 in FIGS. 1—6 or the spring 35 in FIG. 7, is not essential to the operation of the dockboard, it is highly desirable, in that it enables the operator standing on the dock to lift the ramp with a minimum of force. Other counterbalancing mechanisms can be substituted for the weight 30 or spring 35 if desired.

Various modes of carrying out the invention are contemplated as being within the scope of the following claims, particularly pointing out and distinctly claiming the subject matter which is regarded as the invention:

We claim:

1. A dockboard to be mounted on a loading dock having an upper surface and a front wall, comprising a ramp having a first end and an opposed second end, movable guide means pivotally connected to the ramp intermediate said first and second ends of the ramp, and fixed guide means mounted on the front wall of the dock, said movable guide means mounted for vertical movement between upper and lower positions with respect to said fixed guide means and the distance between said upper and lower positions being such that the ramp can be lifted vertically from a first vertical lowered storage position in which the ramp is disposed generally vertically along- side the front wall of the dock, to a second higher vertical position so that the second end of the ramp will clear the deck of a carrier disposed adjacent the front wall of the dock, whereat said ramp can be pivoted about said movable guide means to a generally horizontal position and lowered to a third cross traffic position to span the distance between the dock and the bed of said carrier with the first end supported on the dock, the second end of the ramp being biased downwardly so that the ramp will assume a generally vertical position when the carrier is removed from its location adjacent the front wall of the dock and said ramp will descend to said storage position.

2. The dockboard of claim 1 and including counterbalancing means connected to the movable guide means for counterbalancing the weight of the ramp.

3. The dockboard of claim 1, and including means located at the first end of the ramp and defining a handle to be engaged by an operator to lift the ramp from the storage position to said second position.

4. The dockboard of claim 1, in which the movable guide means is an elongated, vertically disposed, guide member, said guide member having a length such that the upper end of the guide member is disposed beneath the level of the upper surface of the dock when the guide member is in the lower position and the ramp is in the storage position.

5. The dockboard of claim 4, and including a counterweight, a flexible member having one end secured to the counterweight, and a rotatable support member located adjacent the upper surface of the dock and disposed to rotatably support said flexible member, the opposite end of the flexible member being secured to the lower portion of the movable guide member, said counterweight serving to counterbalance the weight of the ramp.

6. The dockboard of claim 4, in which the distance between the pivotal connection of the elongated guide member to the ramp and the lower end of the guide member is greater than the distance between said pivotal connection of the guide member to the ramp and the front edge of the ramp.

7. The structure of claim 1, and including a frame projecting outwardly from the front wall of the dock beyond said fixed guide means, said ramp being located inwardly toward said front wall from the outer extremity of said frame when the ramp is in the storage position whereby the bed of the carrier will engage said frame and be out of contact with the ramp when the carrier is in a loading position.

8. The dockboard of claim 1, in which said fixed guide means comprises fluid cylinder means and said movable guide means comprises piston means slidably mounted within said cylinder means.

9. A dockboard to be supported from a dock having an upper surface and a front wall, comprising a supporting structure mounted on the front wall of the dock and including a pair of generally vertical, spaced, guide tracks, a movable guide member movably disposed in each of said guide tracks, a ramp having front and rear edges and a pair of opposed side edges, means for pivotally connecting said guide members to the side edge portions of the ramp at a location between the front and rear edges, said movable guide members mounted for vertical movement between upper and lower positions on said guide tracks and the distance between said upper and lower positions being at least approximately equal to the front-to-rear dimensions of said ramp, whereby the ramp can be lifted vertically from a first vertical lowered storage position, in which the ramp is disposed generally vertically adjacent the front wall of the dock with the rear edge of the ramp being located adjacent the upper surface of the dock, to a second higher generally vertical position where the front edge of the ramp is at a level to clear the deck of a carrier disposed adjacent the front wall of the dock, said ramp being pivotal about said guide members to a generally horizontal position and lowered to a third cross traffic position to span the distance between the dock and the bed of said carrier, means for pivoting the front edge of the ramp downwardly so that the ramp will return to a vertical position when the carrier is removed from its loading position adjacent the front wall of the dock, said guide members moving downwardly within said guide tracks when said bed is removed to return the ramp to the storage position, rigid means interconnecting the movable guide members to insure uniformity of movement of said guide members in said guide tracks, means located at the rear edge of the ramp and defining a handle to be engaged by an operator to lift the ramp from the storage position to the second position, and stop means for limiting the downward movement of the ramp and positioning the rear edge of the ramp adjacent the upper surface of the dock at a location where the operator can grasp said handle.

10. A dockboard to be mounted on a loading dock having an upper surface and a front wall, comprising a ramp having a first end and an opposed second end, movable guide means pivotally connected to the ramp intermediate said first and second ends, fixed guide means mounted on the front wall of the dock, said movable guide means mounted for vertical movement between upper and lower positions with respect to said fixed guide means and the distance between said upper and lower positions being such that the ramp can be lifted vertically from a first vertical lowered storage position in which the ramp is disposed generally vertically alongside the front wall of the dock with at least a portion of the ramp extending below the level of the upper surface of the dock, to a second higher vertical position so that the second end of the ramp will clear the deck of a carrier disposed adjacent the front wall of the dock, whereat said ramp can be pivoted about said movable guide means to a generally horizontal position and lowered to a third cross traffic position to span the distance between the dock and the bed of said carrier with the first end of the ramp supported on the dock, the second end of the ramp being biased downwardly so that the ramp will assume a generally vertical position when the carrier is removed from its location adjacent the front wall of the dock and said ramp will return to said first vertical storage position, means located at the first end of the ramp and defining a handle to be engaged by the operator to lift the ramp from the first vertical storage position to said second position, and means for limiting the downward movement of the ramp to position said ramp at said first position.